(12) United States Patent
Gottsponer et al.

(10) Patent No.: US 7,126,311 B2
(45) Date of Patent: Oct. 24, 2006

(54) BATTERY BOX FOR RECREATIONAL VEHICLE

(76) Inventors: Gordon Gottsponer, 1817 Cartmell, Pasco, WA (US) 99301; Dave Shirley, 5307 Mays La., Pasco, WA (US) 99301

( * ) Notice: Subject to any disclaimer, the term of this patent is extended or adjusted under 35 U.S.C. 154(b) by 326 days.

(21) Appl. No.: 10/770,744

(22) Filed: Feb. 2, 2004

(65) Prior Publication Data

US 2005/0168190 A1 Aug. 4, 2005

(51) Int. Cl.
*H02J 7/00* (2006.01)
(52) U.S. Cl. .................................................. 320/110
(58) Field of Classification Search ............. 320/107, 320/110; 220/507, 533; 206/703
See application file for complete search history.

(56) References Cited

U.S. PATENT DOCUMENTS 6,367,646 B1    4/2002  Hoagland et al. ........... 220/533
2003/0003350 A1*  1/2003  Heimer et al. ................ 429/99

* cited by examiner

*Primary Examiner*—Karl Easthom
*Assistant Examiner*—Aaron Piggush
(74) *Attorney, Agent, or Firm*—Floyd E. Ivey; Liebler, Ivey, Connor, Berry & St. Hilaire

(57) ABSTRACT

A battery box receiving and supporting multiple batteries of differing sizes having shelves at the right and left sides of the battery box which accommodate different sizes of batteries. Vent and container vent apertures are provided.

5 Claims, 11 Drawing Sheets

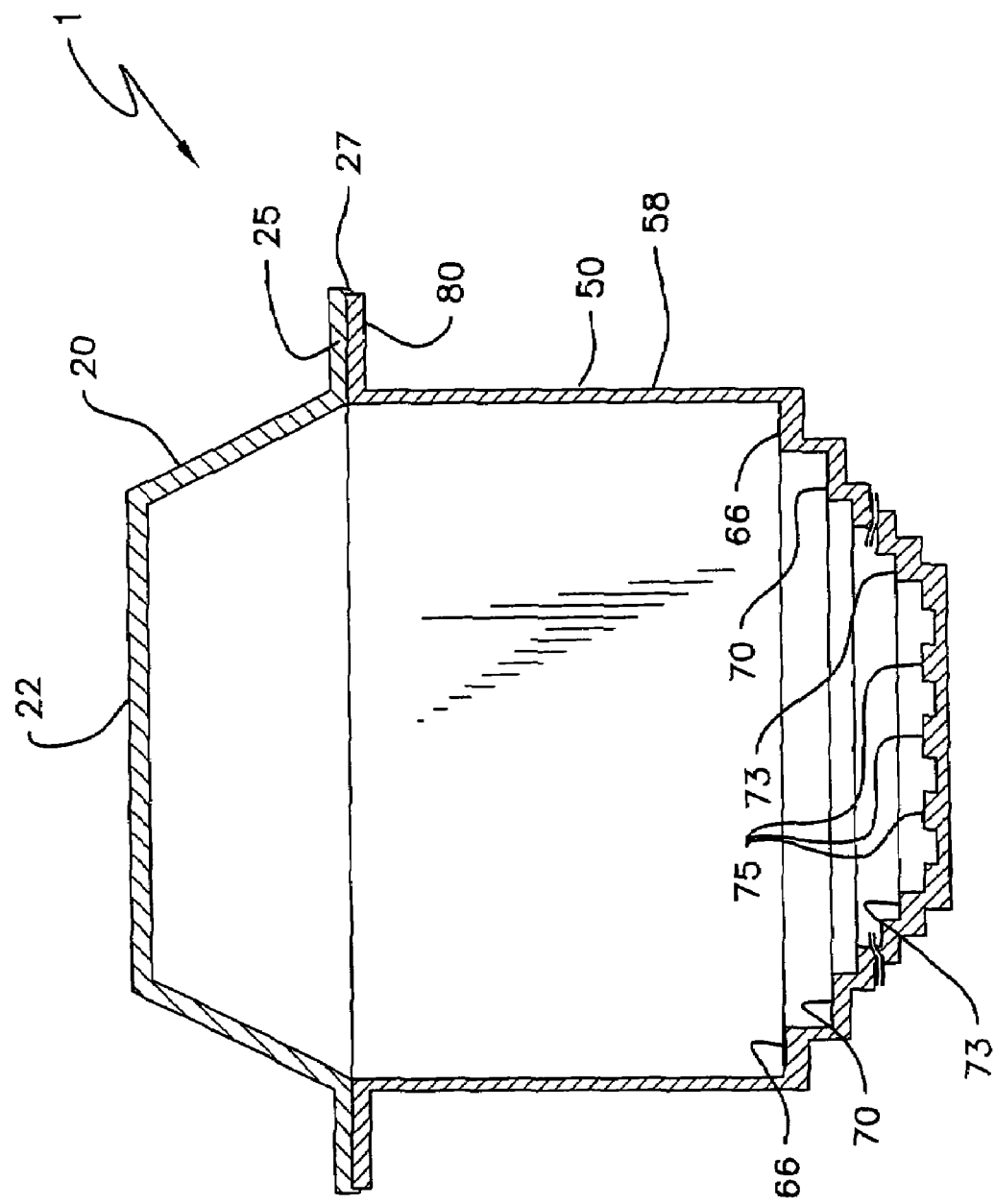

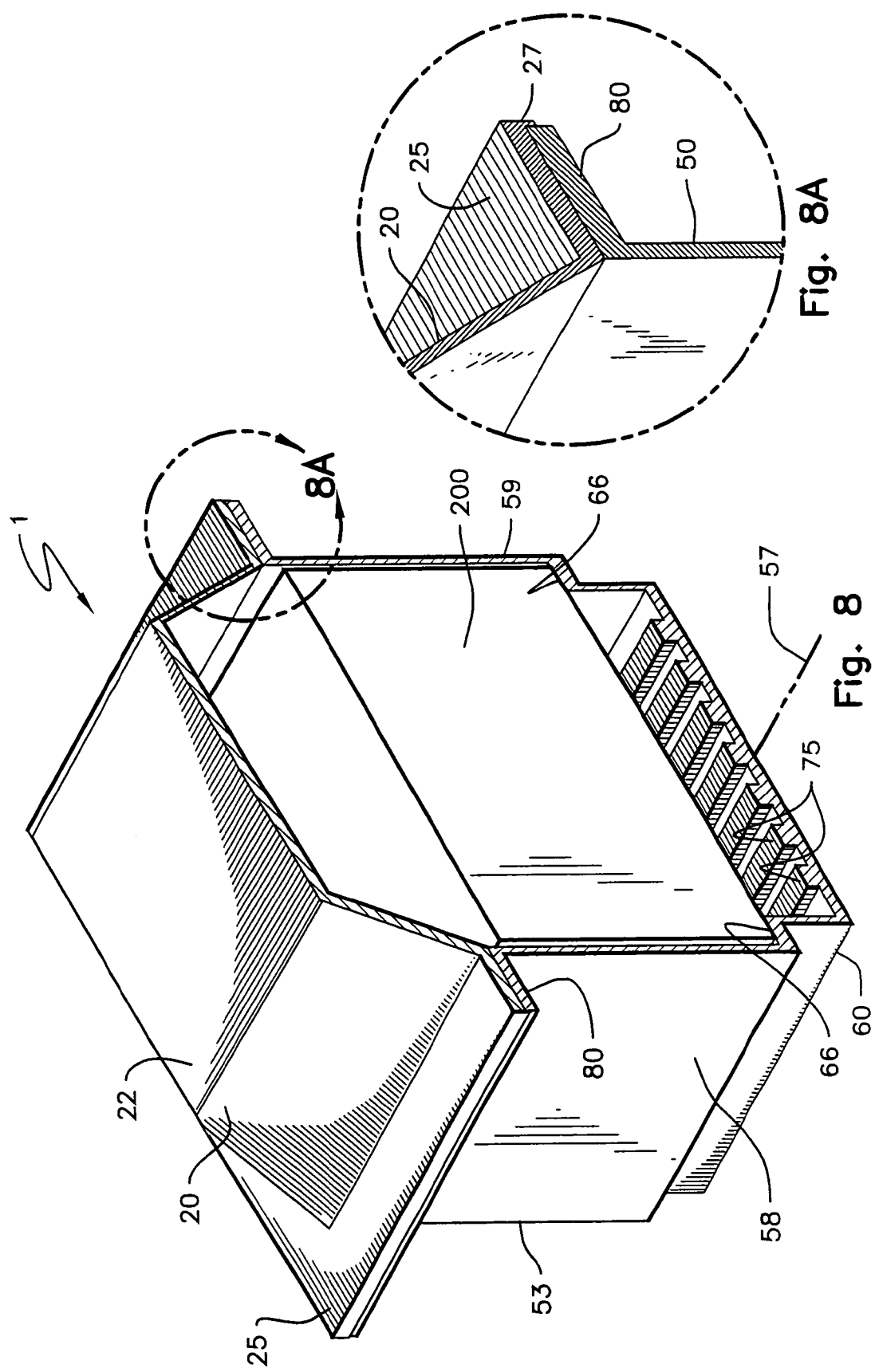

BATTERY BOX FOR RECREATIONAL VEHICLE

FIELD OF THE INVENTION

This invention relates to an apparatus containing one or more batteries. The invention more particularly addresses the storage of one or multiple batteries in recreational vehicles.

BACKGROUND OF THE INVENTION

Battery boxes are known in the prior art. Included is U.S. Pat. No. 6,367,646 to Hoagland et al. The patents referred to herein are provided herewith in an Information Disclosure Statement in accordance with 37 CFR 1.97.

SUMMARY OF THE INVENTION

Recreational vehicles utilize low voltage systems for the operation of many systems including lighting, electrical motors, video, utility and other purposes. Systems are generally 12V but may include other voltages including as 24V and 36V. Battery boxes are known which receive a single battery. This invention addressees the need for containing more than one battery and addresses problems relative to accessibility, weight, venting and the accommodation of batteries of differing sizes. This invention is a battery box which accommodates at least one battery and generally at least two batteries having the structure to accommodate more than one size battery.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1A shows a flange clamp (35) securing the cover (20) and container (50).

FIG. 6A is a section from FIG. 6 showing the first shelf (66), second shelf (70) and n . . . shelf (73). Also represented is a floor (75).

FIG. 8 shows a section from FIG. 7 illustrating the containment of a battery (200) received at a first shelf (66).

FIG. 8A illustrates a cover flange seal (27) and is a detail showing the mating of the cover flange (25) and the container flange (80).

DETAILED DESCRIPTION

Figure 1:
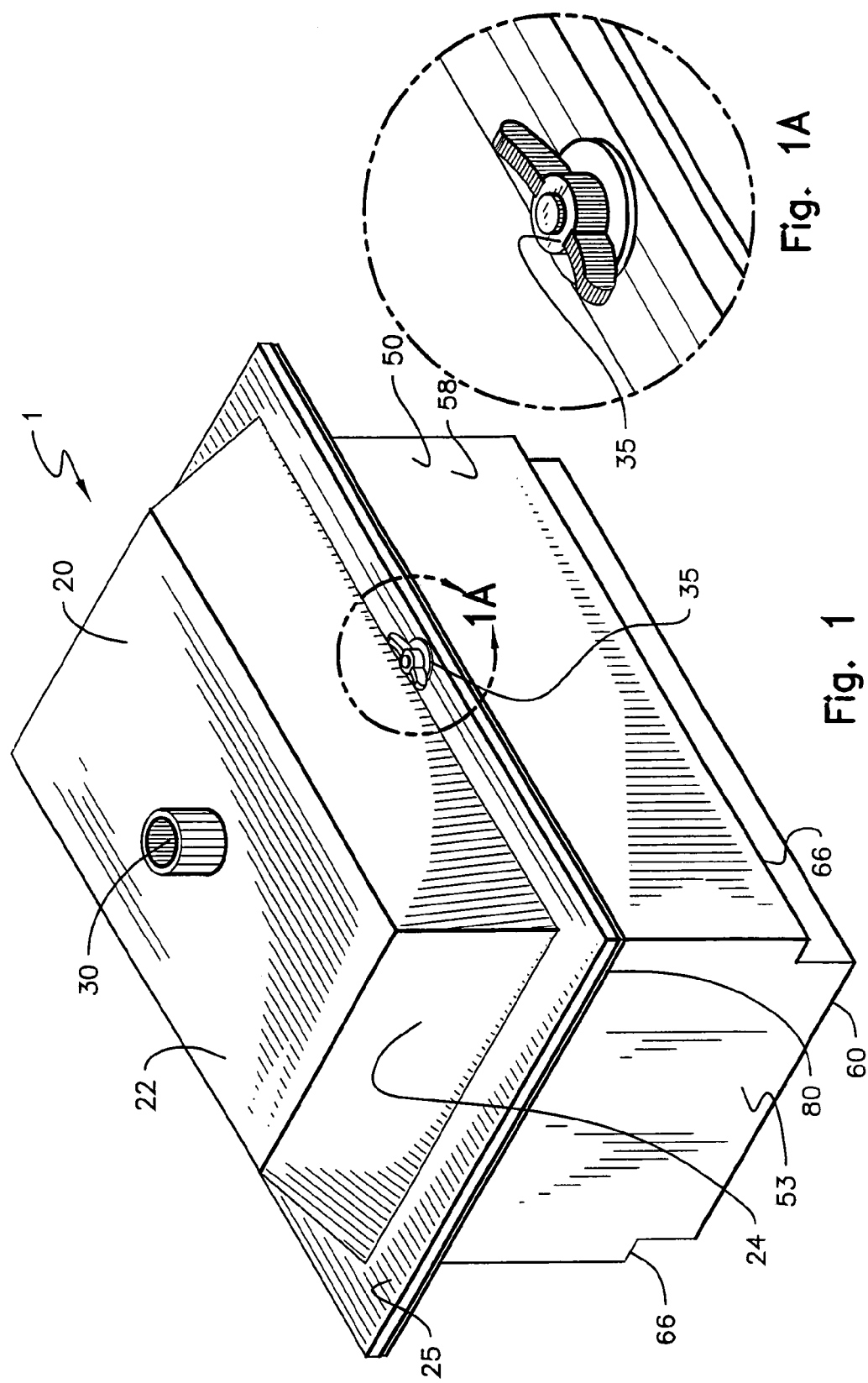
FIG. 1 illustrates a battery box (1) showing a cover (20) and a container (50).

FIGS. 1 through 8A illustrates a container identified as a battery box (1) configured to receive a plurality of batteries (200) with the battery box (1) capable of receiving batteries (200) of differing sizes. FIGS. 1 through 8A show a battery box (1) having a cover (20) which serves as a lid or top for the battery box (1). The cover (20) has a cover top (22) and a cover flange (25). The cover flange (25) is primarily planar extending outwardly for the purpose of providing a mating function with a container (50) which presents a container flange (80) which receives the cover flange (25) such that the cover flange (25) is secured to the contain er flange (80) with a flange securing means (35) shown in FIGS. 1, 1A, 2 and 3 as a bolt with wingnut. Those of ordinary skill in the flange securing arts will recognize that other flange securing means (35) will be the equivalent to the bolt and wing nut shown as a flange clamp (35).

The cover top (22) is distal from the cover flange (25). The cover (20) has a cover inside (24). Vent means (30) is illustrated in FIGS. 1, 2, 3, 4, 5, 6, 7 and 7A comprised here of an aperture from the cover top (22) to the cover inside (24) with a cylinder or tube extending from the indicated aperture upwardly or outwardly from the cover top (22) thereby forming a vent (30). Those of ordinary skills in venting arts will appreciate that other structures will be equivalent.

FIG. 8A is a detail showing the mating of the cover flange (25) and the container flange (80). Also shown is a downwardly projecting sealing means (27) at the cover flange (25) most distal to the cover (20) with the downwardly projecting sealing means (27) in close proximity or in friction contact with the container flange (80) where most distal to the container (50). The downwardly projecting sealing means (27) here is denominated the cover flange seal (27).

The container (50) in the preferred embodiment is primarily box shaped with a rectangular cross section. The container (50), which is substantially box shaped, has a container top (55), which is open in the preferred embodiment, immediately proximal the container flange (80) and a container bottom (60) distal from the container flange (80). The container (50) has a container first end (52) and a container second end (53). A container axis (57) is centrally positioned from the said container first end (52) to the container second end (53) as is indicated in FIGS. 4, 5, 6, 7 and 8. The container (50) has a container inside (63) as seen in FIGS. 4, 5, 6, 7, 7A, and 8. At lease one cable aperture (310) at the container first end (52), container second end (53), container right side (58) or container left side (59) sized to receive battery cables.

A floor (75) is proximal the container bottom (60) and, in the preferred embodiment comprises a series of upstanding ribs parallel to the container axis (57) extending from the said container first end (52) the said container second end (53). In the preferred embodiment the upstanding ribs comprising the floor (75) terminate in a flat surface distal to the bottom. However, those of ordinary skills in battery supporting arts will appreciate that other shapes will equally provide battery support.

The container first end (52) and the container second end (53) are, in the preferred embodiment, orthogon to the container axis (57). As seen in FIGS. 1, 2, 5, 6, 6A and 8, a container right side (58) and a container left side (59) are parallel to the container axis (57) and extend generally upwardly from the container bottom (60). At the container right side (58) and the container left side (59) support means is formed by at least one shelf, as seen in FIGS. 1, 2, 4, 5 and 8, and denominated first shelf (66). The first shelf (66) is parallel to the container axis (57) extending from the container first end (52) to the container second end (53) and provides a right angle cross-section where one arm of the right angle extends outwardly and orthogonal to the container axis (57) and the second arm of the right angle extends upwardly relative to the container bottom (60). It will be appreciated that the arm of the right angle formed by the first shelf (66) at the container right side (58) and at the container left side (59) which extends outwardly and orthogonal to the container axis (57) provides surfaces which will receive and support a battery (200).

Figure 6:
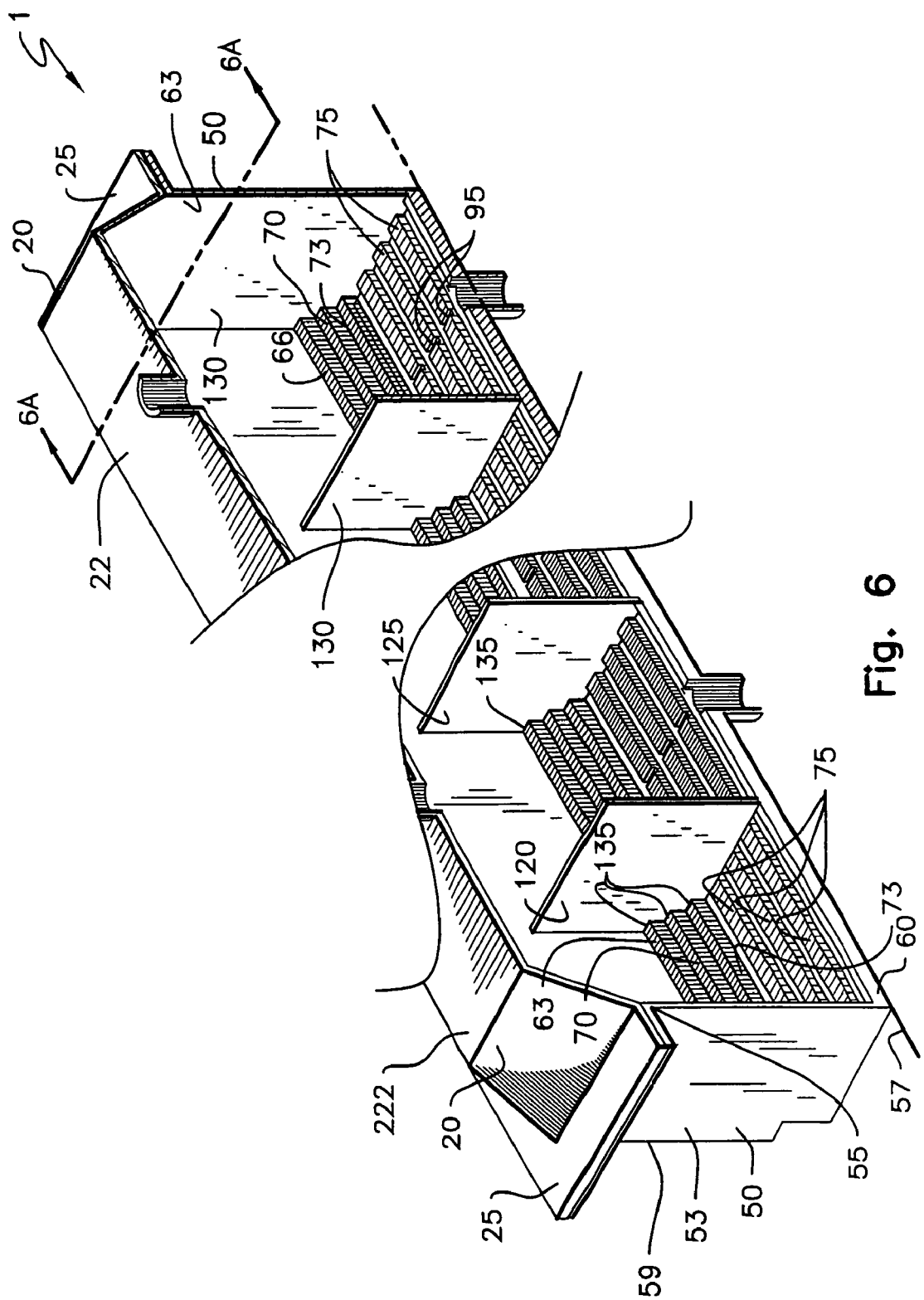
FIG. 6 is a perspective section illustrating provisions for multiple batteries 1 . . . n including a first shelf (66), a second shelf (70) and an n . . . shelf (73). Also illustrated is a container first divider (120), a container second divider (125) and a container n . . . divider (130) with said dividers received into divider slots (135). Also seen is a drain channel (95).

An alternative embodiment of the battery box (1) is illustrated in FIGS. 6 and 6A where a series of battery support means is formed of a series of shelves at the said container right side (58) and container left side (59), denominated in FIGS. 6 and 6A as first shelf (66), second shelf (7) and n . . . shelf (73), where each of said shelves from first to n is interconnected by the second arm of the right angle extending upwardly relative to the container bottom (60) meeting and being permanently affixed by affixing means to the first arm extending outwardly and orthogonally to the container axis (57) forming a series of steps wherein the arm extending outwardly and orthogonally to the container axis (57) receives and supports a battery (200). Hence, in this alternative embodiment, batteries of differing sizes will be received and supported in the container (20) by the appropriate first shelf (66), second shelf (70) or n . . . shelf (73) depending on the batter size and configuration.

Figure 4:
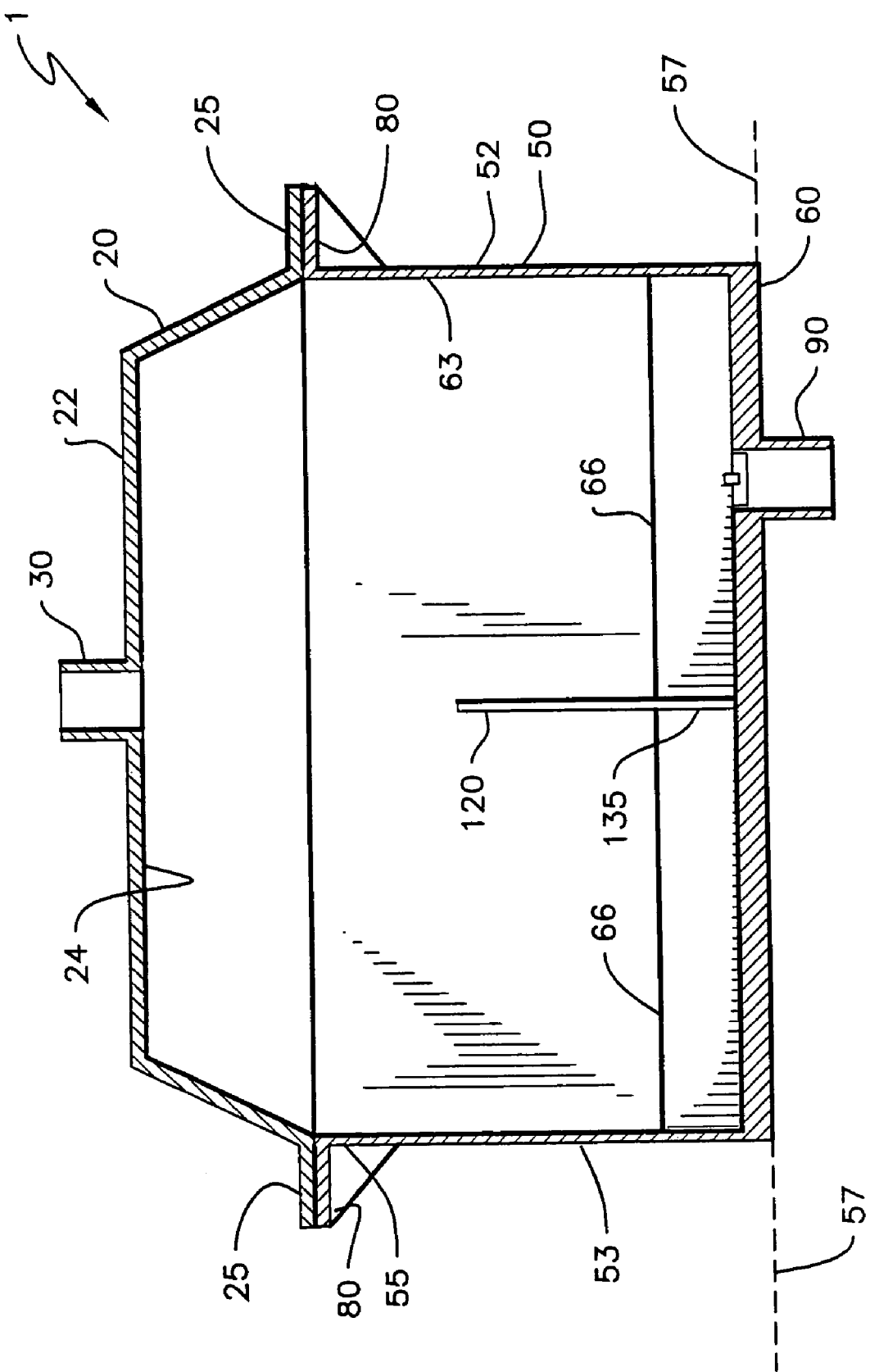
FIG. 4 is a section from FIG. 3 showing the cover (20), cover inside (24), container (50), container inside (63), vent (30), container vent (90) and a container first divider (120).
Figure 5:
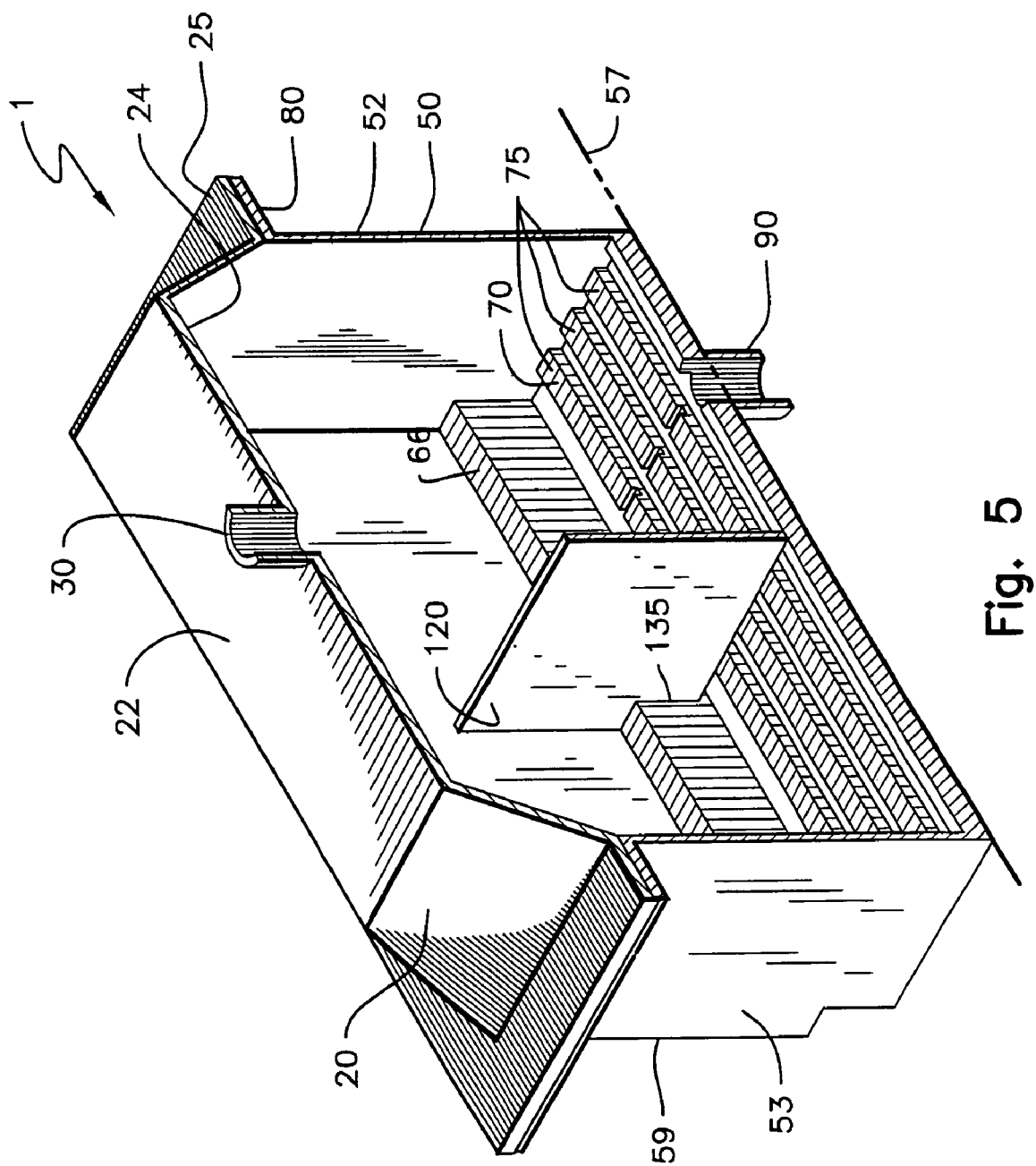
FIG. 5 is a perspective section from FIG. 3 showing elements seen in FIG. 3 and additionally illustrating a container axis (57).
Figure 5A:
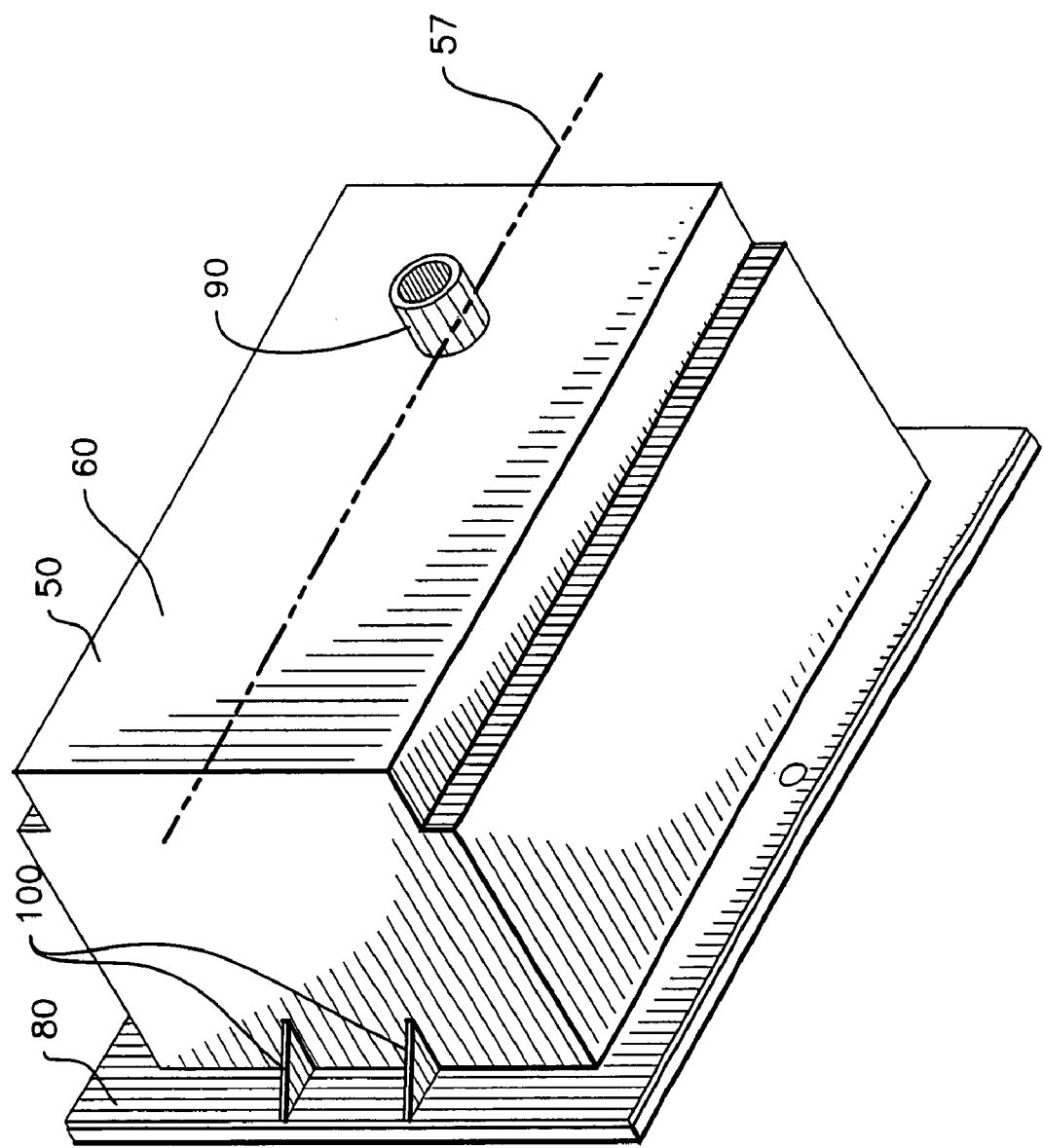
FIG. 5A is a bottom perspective.
Figure 7:
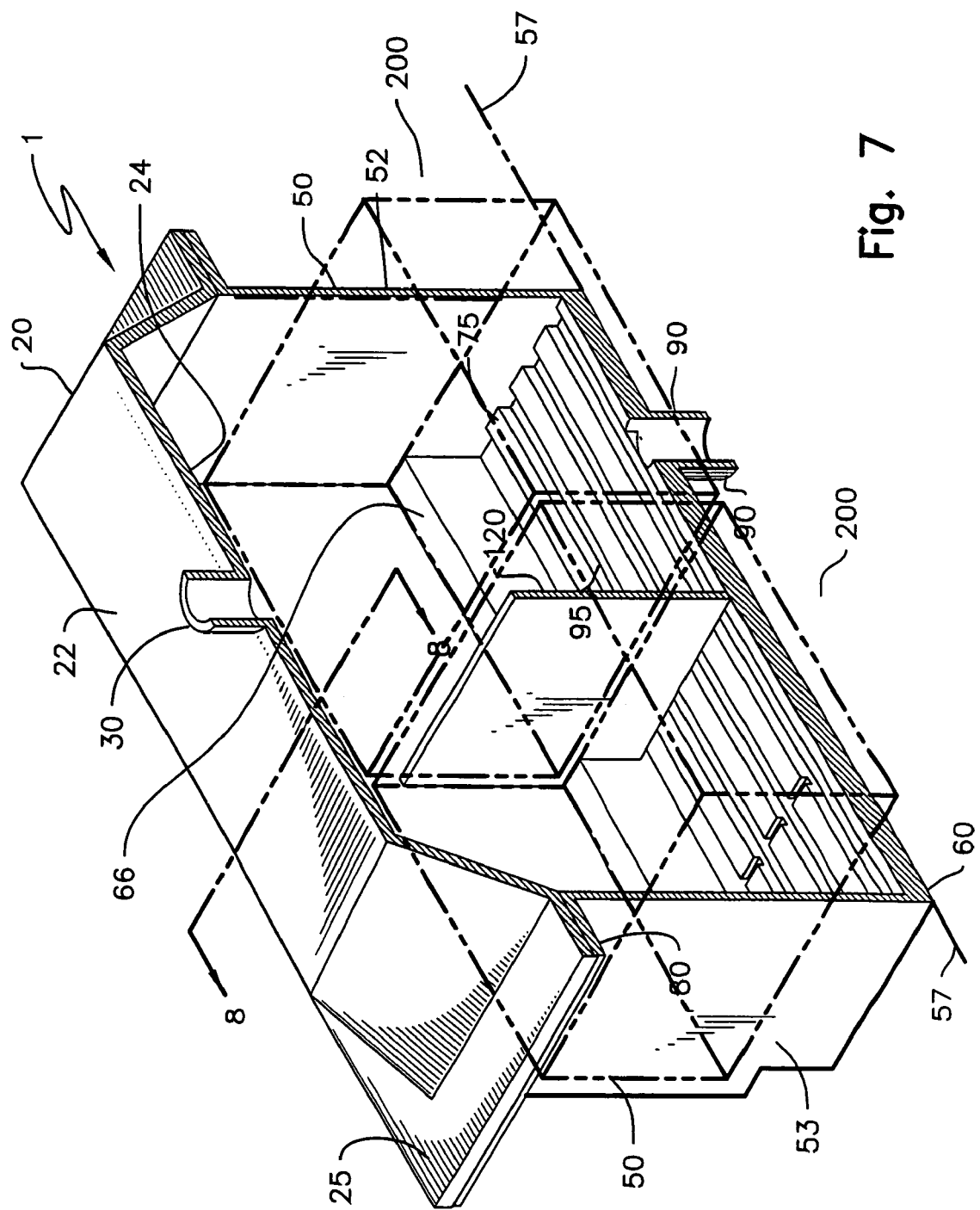
FIG. 7 shows a section from FIG. 4 further illustrating the containment of phantom batteries (200) received at a first shelf (66).
Figure 7A:
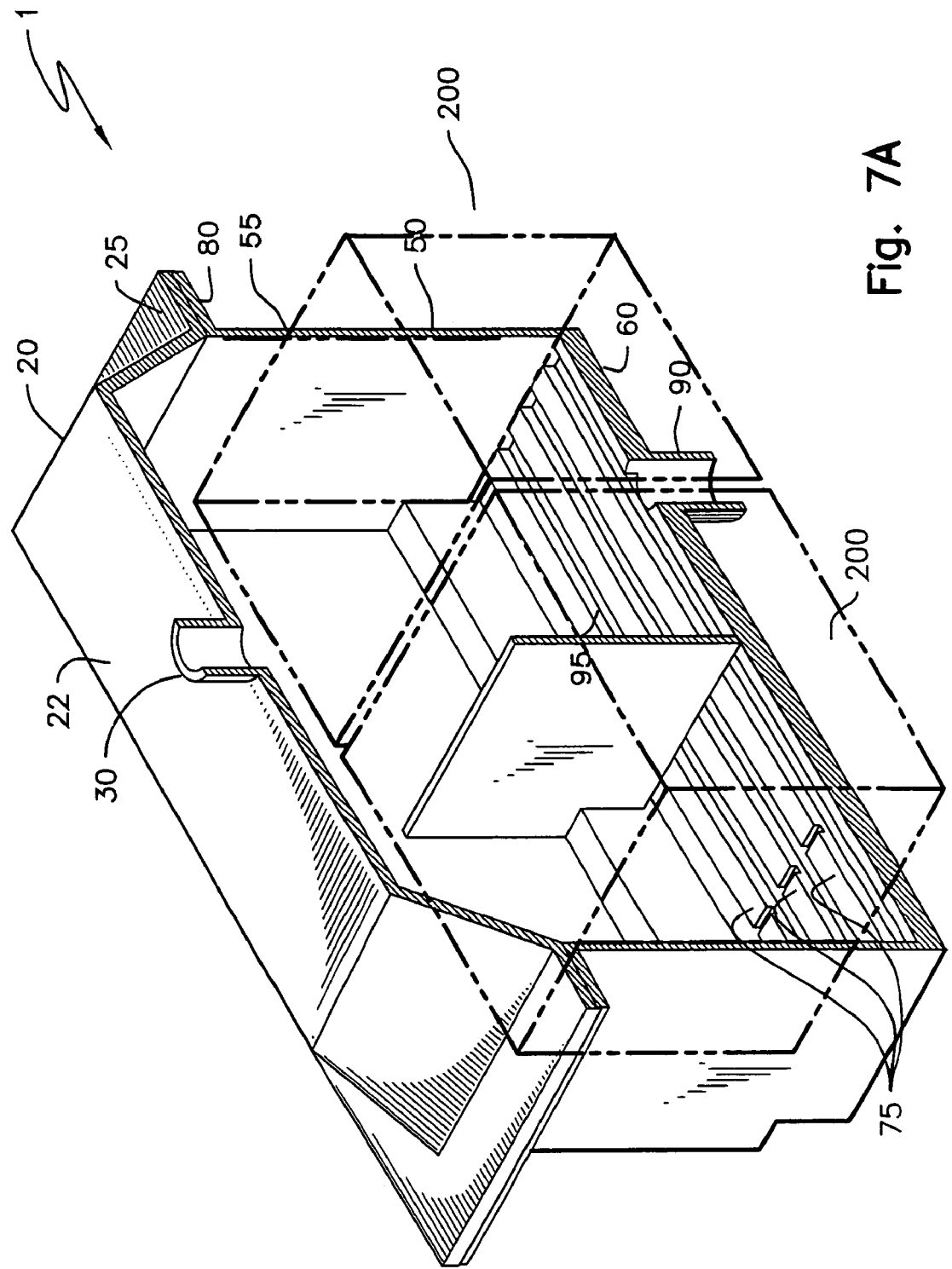
FIG. 7A shows a section from FIG. 4 further illustrating the containment of batteries (200) received at a floor (75).

An aperture means at the container bottom (60) and a cylinder or tube extending downwardly comprises a container vent (90) as depicted in FIGS. 2, 4, 5, 6, 7 and 7A. A drain channel (95), comprised of a grove orthogonal to the container axis (57) to the container right side (58) and to the container left side (59) and extending through the floor (75) at each upstanding rib, is in draining connectivity with the container vent (90), as shown in FIGS. 5, 6 and 7, allows drainage of a discharge from batteries (200) contained in the container (50). It will be appreciated that fluids draining from a battery dictates immediate repair. The container vent (90) is provided to enhance venting in combination with the vent (30). Any drain function is merely incidental to the expected purpose. The vent (30) and container vent (90) are intended to comply with United States Coast Guard Rules and Regulations, the Recreational Vehicle Standards Industry Association (RVIA) and with 2003 NEC Codes.

At least one container divider means (120), denominated container first divider (120) as seen in the preferred embodiment of the invention and depicted in FIGS. 4, 5, 7 and 7A, separates the container (20) at the container inside (63) into at least two compartments each receiving a battery (200). The divider means (120) is a planar member upstanding relative to the container bottom (60) toward the container top (55) and secured by friction fit in a divider slot (135) at both the container right side (58) and the container left side (59) as seen in FIGS. 4, 5 and 6. Said divider slots (135) are generally orthogonal to the container axis (57).

In the alternative embodiment receiving more than two batteries (200) a plurality of divider means (120), shown in FIG. 6, comprise a container first divider (120), a container second divider (125) and a container n . . . divider (130). Each of said container first divider (120), a container second divider (125) and a container n . . . divider (130) are generally planar and upstanding from the container bottom (60) toward the container top (55) and are affixed by friction or equivalent means at a plurality of divider slots (135) at the container right side (58) and the container left side (59). The at least one container divider means (120) and each of said container first divider (120), a container second divider (125) and a container n . . . divider (130) are removable for transport or shipping.

None of the container first divider (120), a container second divider (125) or a container n . . . divider (130) extend to the container bottom (60) to insure drainage connectivity from each battery (200) with the container vent (90).

Figure 2:
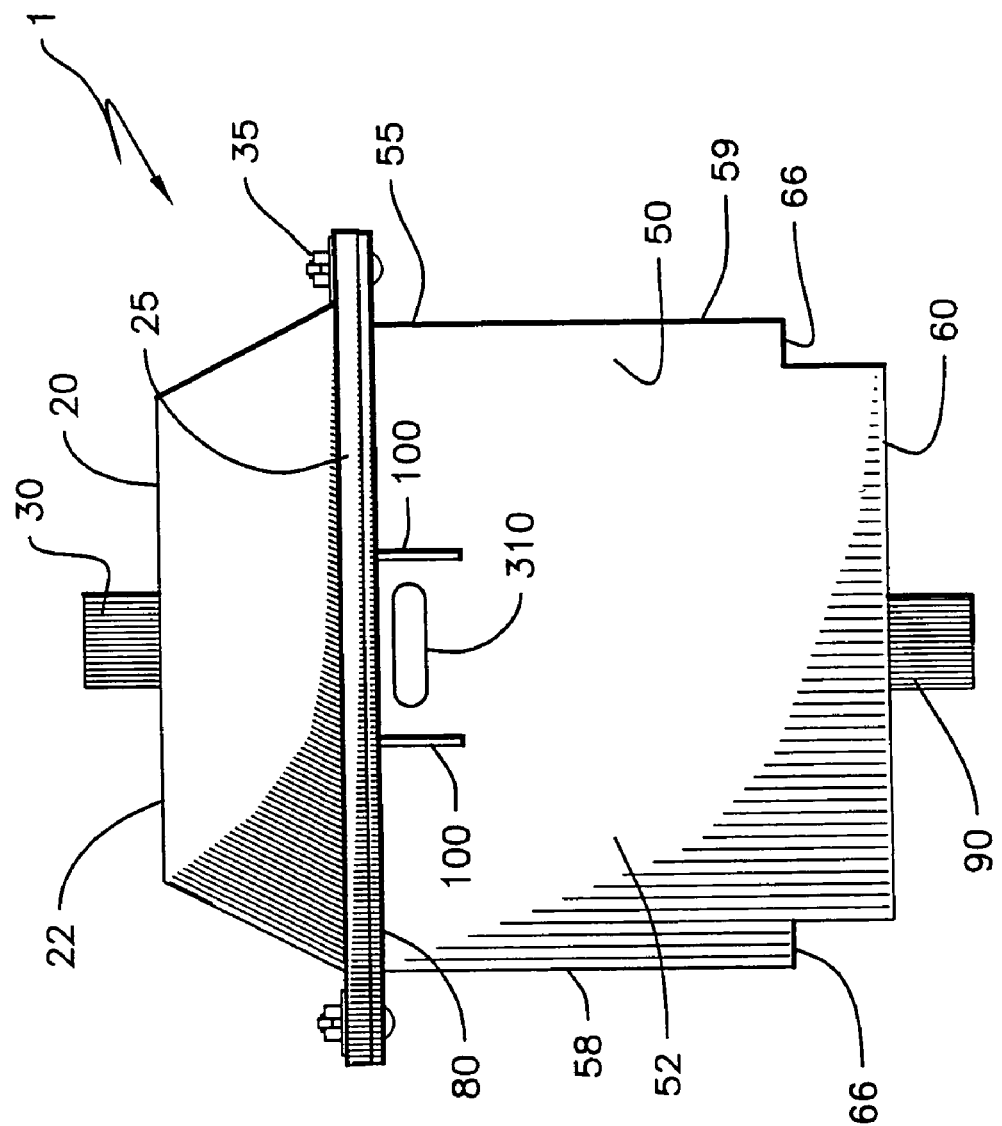
FIG. 2 is side elevation of the battery box (1) showing a cable aperture (310).
Figure 3:
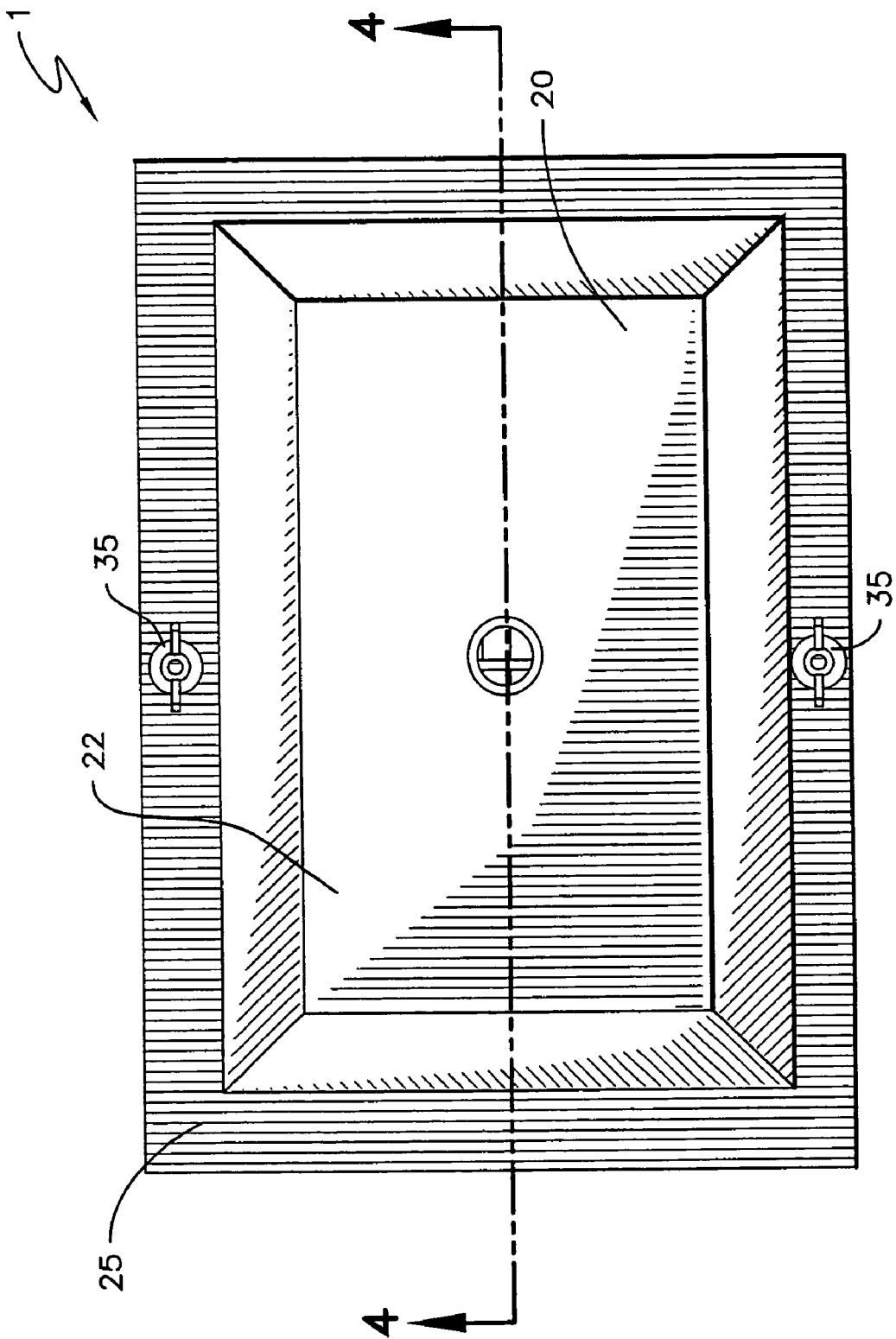
FIG. 3 is a top plan view showing the cover (20) and vent (30).

Support gussets (100) are depicted in FIG. 2 as generally expected structural devices found in construction of such covers (20) and containers (50) in plastics, metals and other materials.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A battery box comprising:
   a. a cover (20);
   b. a container (50) open at a container top (55); the container (20) has a container right side (58) and a container left side (59); the container (50) receives the cover (20) at the container top (55);
   c. at the container right side (58) and the container left side (59) shelf support means is formed by at least one first shelf (66);
   d. the cover (20) having a cover top (22) and a cover flange (25); the cover flange (25) is planar extending outwardly; the cover top (22) is distal from the cover flange (25); the cover (20) has a cover inside (24);
   e. the container (50) having a container first end (52), a container second end (53) a container flange (80); a container axis (57) is centrally positioned from the container first end (52) to the container second end (53);
   f. the container first end (52) and the container second end (53) are orthogonal to the container axis (57); the container right side (58) and the container left side (59) are parallel to the container axis (57) and extend generally upwardly from container bottom (60);
   g. the at least one first shelf (66) is parallel to the container axis (57) extending from the container first end (52) to the container second end (53) and provides a right angle cross-section where one arm of the right angle extends outwardly and orthogonal to the container axis (57) and the second arm of the right angle extends upwardly relative to the container bottom (60); the arm of the right angle formed by the first shelf (66) at the container right side (58) and at the container left side (59) which extends outwardly and orthogonal to the container axis (57);

h. at least one container divider means (120) comprising at least one container first divider (120) separates container (20) at the container inside (63) into at least two compartments;
i. the at least one first shelf (66) comprised of a plurality or series of battery support means (66) is formed of a series of shelves at the said container right side (58) and container left side (59) as first shelf (66), second shelf (7) and n . . . shelf (73), where each of said shelves from first shelf (66) to n . . . shelf (73) is interconnected by a second arm of a right angle extending upwardly relative to the container bottom (60) meeting and being permanently affixed by affixing means to a first arm extending outwardly and orthogonally to the container axis (57) forming a series of steps wherein the arm extending outwardly and orthogonally to the container axis (57) receives and supports at least one battery (200);
j. said plurality of battery support means receive and support batteries of differing sizes and configurations;
k. the at least one means (120) is a planar member upstanding, relative to the container bottom (60), toward the container top (55) and secured by friction fit in a divider slot (135) at both the container right side (58) and the container left side; said divider slots (135) are generally orthogonal to the container axis (57);
l. at lease one cable aperture (310) at the container first end (52), container second end (53), container tight side (58) or container left side (59) sized to receive battery cables.

2. A battery box of claim 1 further comprising:
a. the container flange (80) receives the cover flange (25) such that the cover flange (25) is secured to the container flange (80) with a flange securing means (35);
b. the container (50) is generally box shaped with a polyangular or rectangular cross section; the container top (55) is immediately proximal the container flange (80) and the container bottom (60) distal from the container flange (80); the container (50) has a container inside (63);
c. the at least one divider means (120) comprises a plurality of divider means comprising a container first divider (120), a container second divider (125) and a container n . . . divider (130); each of said container first divider (120), container second divider (125) and container n . . . divider (130) are generally planar and upstanding from the container bottom (60) toward the container top (55) and are affixed by friction, or equivalent means, at a plurality of divider slots (135) at the container right side (58) and the container left side (59).

3. A battery box of claim 2, further comprising:
a. flange securing means (35) provided by a flange clamp (35);
b. vent means (30) is comprised of an aperture from the cover top (22) to the cover inside (24);
c. container vent means (90) is comprised of an aperture at the container bottom (60);
d. a floor (75) is proximal the container bottom (60) and comprises a series of upstanding ribs parallel to the container axis (57) extending from the said container first end (52) to the said container second end (53)
e. each of said container first divider (120), container second divider (125) and container n . . . divider (130) are removable for transport or shipping.

4. A battery box of claim 3, further comprising:
a. flange clamp (35) comprised of a bolt and wing nut;
b vent means (30) having a tube extending the vent aperture upwardly or outwardly from the cover top (22);
c. a cylinder or tube extending downwardly from the container vent means (90) comprises a container vent (90); a drain channel (95), comprised of a grove orthogonal to the container axis (57) to the container right side (58) and to the container left side (59) and extending through the floor (75) at each upstanding rib, is in draining connectivity with the container vent (90);
d. a downwardly projecting sealing means (27) at the cover flange (25) most distal to the cover (20) with the downwardly projecting sealing means (27) in close proximity or in friction contact with the container flange (80) where most distal to the container (50);
e. the upstanding ribs comprising the floor (75) terminate in a flat surface distal to the bottom.

5. A battery box of claim 4, further comprising:
a. the downwardly projecting sealing means (27) is a cover flange seal (27);
b. none of the at least one divider (120) or plurality of divider means extend to the container bottom (60);
c. support gussets (100) are found in construction of such battery boxes (1) including in covers (20) and containers (50); battery boxes (1) are constructed from generally rigid materials including plastics, metals and other materials.

* * * * *